(12) United States Patent
Kakuya

(10) Patent No.: US 12,475,925 B2
(45) Date of Patent: Nov. 18, 2025

(54) MAGNETIC DISK DEVICE AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takumi Kakuya, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/829,782

(22) Filed: Sep. 10, 2024

(65) Prior Publication Data

US 2025/0299698 A1  Sep. 25, 2025

(30) Foreign Application Priority Data

Mar. 22, 2024 (JP) ................. 2024-045985

(51) Int. Cl.
*G11B 5/54* (2006.01)
*G11B 5/48* (2006.01)
*G11B 19/02* (2006.01)

(52) U.S. Cl.
CPC ............ *G11B 19/02* (2013.01); *G11B 5/4886* (2013.01)

(58) Field of Classification Search
CPC .... G11B 5/54; G11B 5/58; G11B 5/00; G11B 5/09; G11B 5/5547
USPC ......................................................... 360/75
See application file for complete search history.

(56) References Cited

U.S. PATENT DOCUMENTS

| 8,713,219 B2* | 4/2014 | Takeuchi ............... G06F 13/00 710/52 |
| 10,802,739 B1 | 10/2020 | Weber et al. |
| 11,379,150 B2 | 7/2022 | Bent et al. |
| 2021/0124641 A1 | 4/2021 | Caldwell, Jr. |

\* cited by examiner

*Primary Examiner* — Nabil Z Hindi
(74) *Attorney, Agent, or Firm* — Maier & Maier, PLLC

(57) ABSTRACT

According to one embodiment, a memory of a magnetic disk device includes a plurality of control queues respectively corresponding to a plurality of actuator systems. A controller receives a plurality of first commands from a host, and stores the plurality of first commands in one of the plurality of control queues. The controller generates a second command for internal processing, and stores the second command in a first control queue that stores a smallest number of commands among the plurality of control queues. The controller executes, for each of the plurality of control queues, processing one or more commands stored in one control queue of the plurality of control queues by using an actuator system corresponding to the one control queue among the plurality of actuator systems.

6 Claims, 7 Drawing Sheets

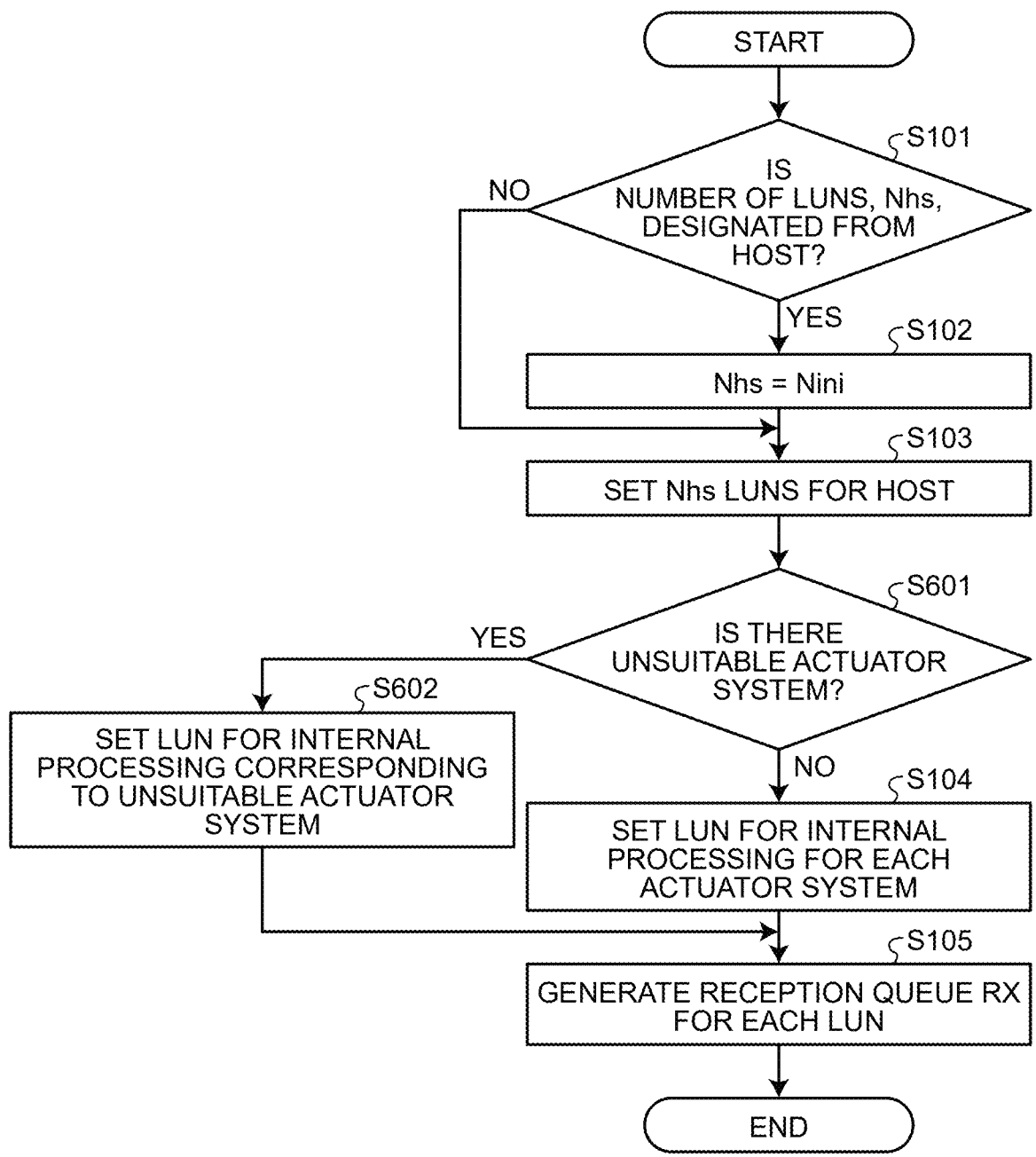

MAGNETIC DISK DEVICE AND METHOD

CROSS-REFERENCE TO RELATED APPLICATIONS

This application is based upon and claims the benefit of priority from Japanese Patent Application No. 2024-045985, filed on Mar. 22, 2024; the entire contents of which are incorporated herein by reference.

FIELD

Embodiments described herein relate generally to a magnetic disk device and a method.

BACKGROUND

There is known a magnetic disk device that can independently move two or more magnetic heads by two or more actuator systems. In such a magnetic disk device, it is possible to simultaneously perform disk access by using the two or more actuator systems.

BRIEF DESCRIPTION OF THE DRAWINGS

FIG. 9 is a flowchart illustrating an example of an operation of generating LUNs according to the second embodiment.

DETAILED DESCRIPTION

In general, according to one embodiment, a magnetic disk device includes a magnetic disk, a plurality of magnetic heads, a plurality of actuator systems, a memory, and a controller. The plurality of magnetic heads is configured to write and read data to and from the magnetic disk. The plurality of actuator systems is configured to relatively move some different magnetic heads among the plurality of magnetic heads with respect to the magnetic disk. The memory includes a plurality of control queues respectively corresponding to the plurality of actuator systems. Each of the plurality of control queues is configured to be capable of storing one or more commands. The controller is configured to receive a plurality of first commands from a host, and store the plurality of first commands in one of the plurality of control queues. In addition, the controller is configured to generate a second command for internal processing, and store the second command in a first control queue that stores a smallest number of commands among the plurality of control queues. Furthermore, the controller is configured to execute, for each of the plurality of control queues, processing one or more commands stored in one control queue of the plurality of control queues by using an actuator system corresponding to the one control queue among the plurality of actuator systems.

Exemplary embodiments of a magnetic disk device and a method will be explained below in detail with reference to the accompanying drawings. The present invention is not limited to the following embodiments.

First Embodiment

Figure 1:
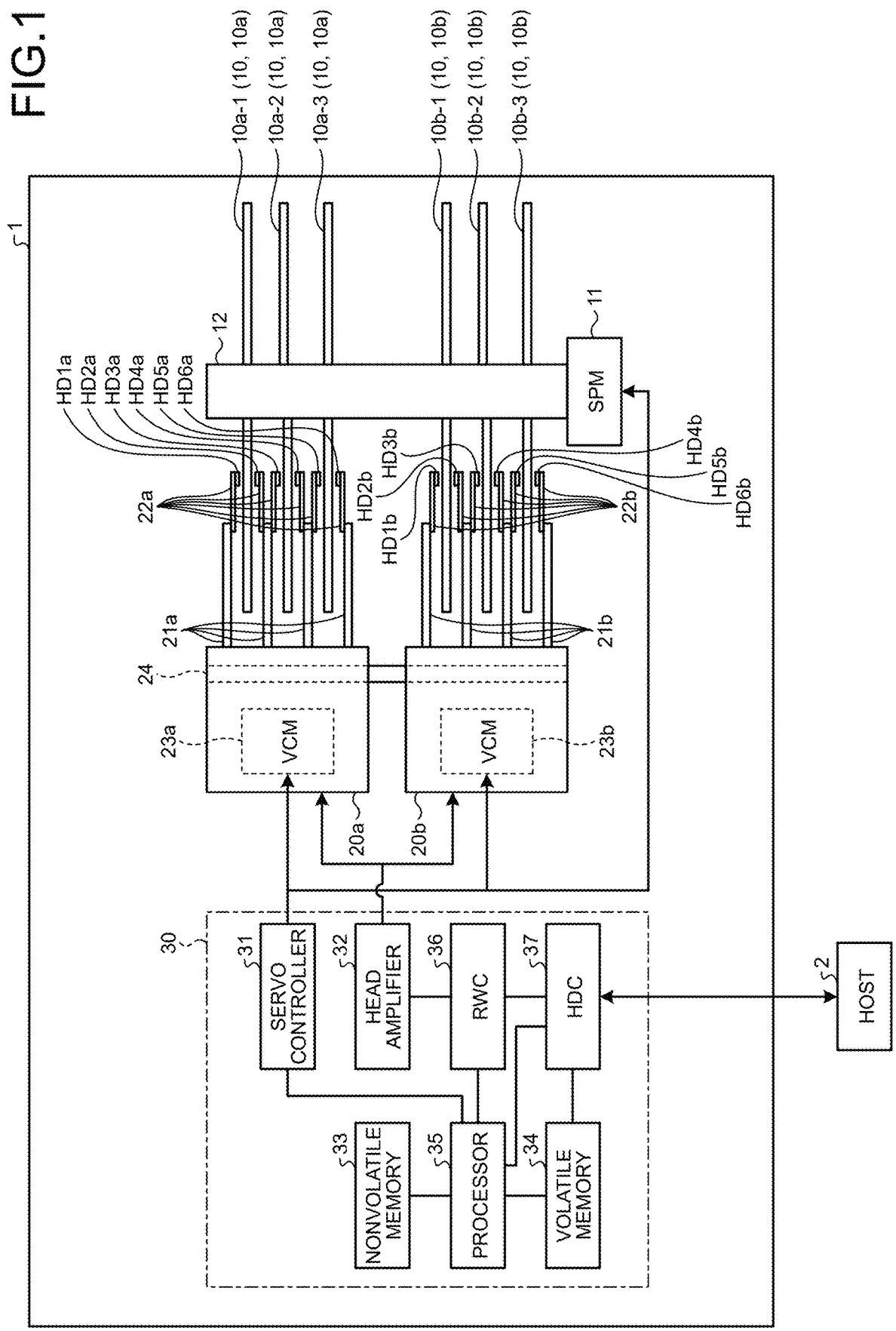
FIG. 1 is a diagram illustrating an example of a configuration of a magnetic disk device according to a first embodiment.

FIG. 1 is a diagram illustrating an example of a configuration of a magnetic disk device 1 according to a first embodiment. The magnetic disk device 1 can be connected to a host 2. The standard of a communication path between the magnetic disk device 1 and the host 2 is not limited to a specific standard. In one example, serial attached SCSI (SAS) can be adopted.

The host 2 is, for example, a processor, a personal computer, or a server. The magnetic disk device 1 can receive an access command from the host 2. The access command is a command for requesting an operation involving access to the magnetic disk 10 and specifically includes a read command and a write command. In addition, the magnetic disk device 1 can receive a mode select command and an inquiry command from the host 2. The mode select command is a command for setting various operations of the magnetic disk device 1, such as enabling/disabling cache or setting the number of times of retry when an error occurs. The inquiry command is a command for requesting information of the magnetic disk device 1, for example, a vendor ID or a product ID.

Note that, although details will be described later, the magnetic disk device 1 can include a plurality of logical units. A command from the host 2 can include a logical unit number (LUN) which is an identification number indicating a target logical unit.

The magnetic disk device 1 includes a spindle motor (SPM) 11 and a plurality of magnetic disks 10 that rotate about a rotation shaft 12 of the spindle motor 11. Here, as an example, in the magnetic disk device 1, six magnetic disks 10a-1, 10a-2, 10a-3, 10b-1, 10b-2, and 10b-3 are integrally rotated by the SPM310.

Recording surfaces capable of recording data are formed on the front surfaces and the back surfaces of the six magnetic disks 10. That is, the six magnetic disks 10 have twelve recording surfaces. In order to access each of the twelve recording surfaces, the magnetic disk device 1 includes twelve magnetic heads HD1a to HD6a and HD1b to HD6b corresponding to the twelve recording surfaces.

Note that, as an example, a side opposite to the spindle motor 11 is referred to as a front surface herein. A side on the spindle motor 11 is referred to as a back surface. Note that the definitions of the front surface and the back surface are not limited to the above.

The magnetic head HD1a is included in such a manner as to face the front surface of the magnetic disk 10a-1. The magnetic head HD2a is included in such a manner as to face the back surface of the magnetic disk 10a-1. The magnetic head HD3*a* is included in such a manner as to face the front surface of the magnetic disk 10*a*-2. The magnetic head HD4*a* is included in such a manner as to face the back surface of the magnetic disk 10*a*-2. The magnetic head HD5*a* is included in such a manner as to face the front surface of the magnetic disk 10*a*-3. The magnetic head HD6*a* is included in such a manner as to face the back surface of the magnetic disk 10*a*-3.

The magnetic head HD1*b* is included in such a manner as to face the front surface of the magnetic disk 10*b*-1. The magnetic head HD2*b* is included in such a manner as to face the back surface of the magnetic disk 10*b*-1. The magnetic head HD3*b* is included in such a manner as to face the front surface of the magnetic disk 10*b*-2. The magnetic head HD4*b* is included in such a manner as to face the back surface of the magnetic disk 10*b*-2. The magnetic head HD5*b* is included in such a manner as to face the front surface of the magnetic disk 10*b*-3. The magnetic head HD6*b* is included in such a manner as to face the back surface of the magnetic disk 10*b*-3.

Hereinafter, the twelve magnetic heads HD1*a* to HD6*a* and HD1*b* to HD6*b* may be collectively referred to as the magnetic heads HD. Each of the magnetic heads HD executes access, namely, data write and data read, to a recording surface of one of the six magnetic disks 10 facing the magnetic head HD. That is, the magnetic heads HD1*a* to HD6*a* execute access to the recording surfaces of the magnetic disks 10*a*-1, 10*a*-2, and 10*a*-3. The magnetic heads HD1*b* to HD6*b* execute access to the recording surfaces of the magnetic disks 10*b*-1, 10*b*-2, and 10*b*-3.

The magnetic disk device 1 includes two actuator systems 20*a* and 20*b* that can be individually driven. The first actuator system 20*a* includes four actuator arms 21*a*, six suspensions 22*a*, and a voice coil motor (VCM) 23*a*. Each of the six suspensions 22*a* supports any one of the magnetic heads HD1*a* to HD6*a*. Each of the six suspensions 22*a* is attached to a tip of any one of the four actuator arms 21*a*.

The second actuator system 20*b* includes four actuator arms 21*b*, six suspensions 22*b*, and a voice coil motor (VCM) 23*b*. Each of the six suspensions 22*b* supports any one of the magnetic heads HD1*b* to HD6*b*. Each of the six suspensions 22*b* is attached to a tip of any one of the four actuator arms 21*b*.

The two actuator systems 20*a* and 20*b* can rotate about the rotation shaft 24. The rotation shaft 24 is included at a position parallel to the rotation shaft 12 and separated from the rotation shaft 12. The voice coil motor 23*a* can rotate the first actuator system 20*a* within a predetermined range about the rotation shaft 24. The voice coil motor 23*b* rotates the second actuator system 20*b* within a predetermined range about the rotation shaft 24. Therefore, the first actuator system 20*a* moves the magnetic heads HD1*a* to HD6*a* relatively to the recording surfaces of the magnetic disks 10*a*-1 to 10*a*-3 in the radial direction. The second actuator system 20*b* moves the magnetic heads HD1*b* to HD6*b* relatively to the recording surfaces of the magnetic disks 10*b*-1 to 10*b*-3 in the radial direction.

The magnetic disk device 1 further includes a servo controller 31, a head amplifier 32, a nonvolatile memory 33, a volatile memory 34, a processor 35, a read and write channel (RWC) 36, and a hard disk controller (HDC) 37.

The head amplifier 32 supplies a signal corresponding to data input from the read and write channel 36 to a magnetic head HD facing a recording surface of a write destination. Furthermore, the head amplifier 32 amplifies a signal output from a magnetic head HD facing a recording surface of a read source and supplies the amplified signal to the read and write channel 36.

The nonvolatile memory 33 includes, for example, a nonvolatile memory such as a flash memory. A program executed by the processor 35 is recorded in the nonvolatile memory 33.

The volatile memory 34 includes a volatile memory such as a dynamic random access memory (DRAM) or a static random access memory (SRAM). The volatile memory 34 functions as a buffer memory area, a cache memory area, an area in which a program is loaded, or the like.

The read and write channel 36 modulates data stored in a buffer memory area (for example, the volatile memory 34) and outputs the data to the head amplifier 32. Furthermore, the read and write channel 36 demodulates the signal supplied from the head amplifier 32 and outputs the demodulated signal to the hard disk controller 37.

The hard disk controller 37 is a communication interface that enables communication with the host 2. Specifically, when the hard disk controller 37 receives a write command from the host 2, the hard disk controller 37 writes data requested to be written by the write command in the buffer memory area. When receiving the read command from the host 2, the hard disk controller 37 transmits data requested to be read by the read command to the host 2 via the buffer memory area.

The servo controller 31 supplies power to the spindle motor 11, thereby integrally rotating the twelve magnetic disks 10 at a predetermined speed. Furthermore, the servo controller 31 drives the voice coil motor 23*a* and the voice coil motor 23*b* to move a magnetic head HD to an access position (namely, a write destination track or a read source track) instructed by the processor 35.

The processor 35 is, for example, a central processing unit (CPU). The processor 35 executes various types of processing by a program stored in a nonvolatile storage medium such as the nonvolatile memory 33 or the magnetic disks 10.

For example, the processor 35 executes control of data writing and data reading by the magnetic heads HD, processing of determining an access position on a recording surface of a magnetic disk 10, processing of instructing the access position to the servo controller 31, internal processing, and the like.

The internal processing includes processing of writing a log to a magnetic disk 10, health monitoring, or the like. As the log, for example, a measurement value of the power supply voltage, a temperature measurement value, whether or not vibration is detected, or the like are written to the magnetic disk 10. Writing of the log is executed periodically or when an abnormality is detected. The health monitoring is executed periodically or in response to a predetermined operation such as activation of the magnetic disk device 1. That is, the execution timing of the internal processing is not limited to specific timing.

The servo controller 31, the head amplifier 32, the nonvolatile memory 33, the volatile memory 34, the processor 35, the read and write channel 36, and the hard disk controller 37 constitute the controller 30 of the embodiment. Note that the components of the controller 30 are not limited to the above.

Some or all of the functions of the processor 35 may be implemented by other components (for example, the servo controller 31, the head amplifier 32, the read and write channel 36, or the hard disk controller 37) in the controller 30. In addition, some or all of the functions of the processor 35 may be implemented by a hardware circuit such as a field-programmable gate array (FPGA) or an application specific integrated circuit (ASIC).

Regarding the response speed to an access command as viewed from the host 2 side, it is desirable to respond to an access command from the host 2 as quickly as possible. In addition, in recent years, there are cases where it is desired to process a large number of commands from the host 2 including commands other than the access command such as a mode select command or an inquiry command as quickly as possible in addition to the access commands.

Therefore, in the first embodiment, when it is necessary to execute internal processing, the controller 30 allocates the internal processing to an actuator system 20 having a smaller number of commands to be executed, which are received from the host 2, out of the two actuator systems 20. As a result, a decrease in the response speed to a command from the host 2 due to the internal processing is suppressed.

Hereinafter, a command received from the host 2 is referred to as a host command. In addition, a command related to internal processing is referred to as an internal processing command. The internal processing command is issued by the controller 30 itself.

Note that, in the example illustrated in FIG. 1, the magnetic disk device 1 includes two actuator systems 20. The number of actuator systems 20 included in the magnetic disk device 1 may be three or more. That is, the magnetic disk device 1 can include a plurality of actuator systems 20 that each moves one of different groups of magnetic heads HD among the plurality of magnetic heads HD.

Figure 2:
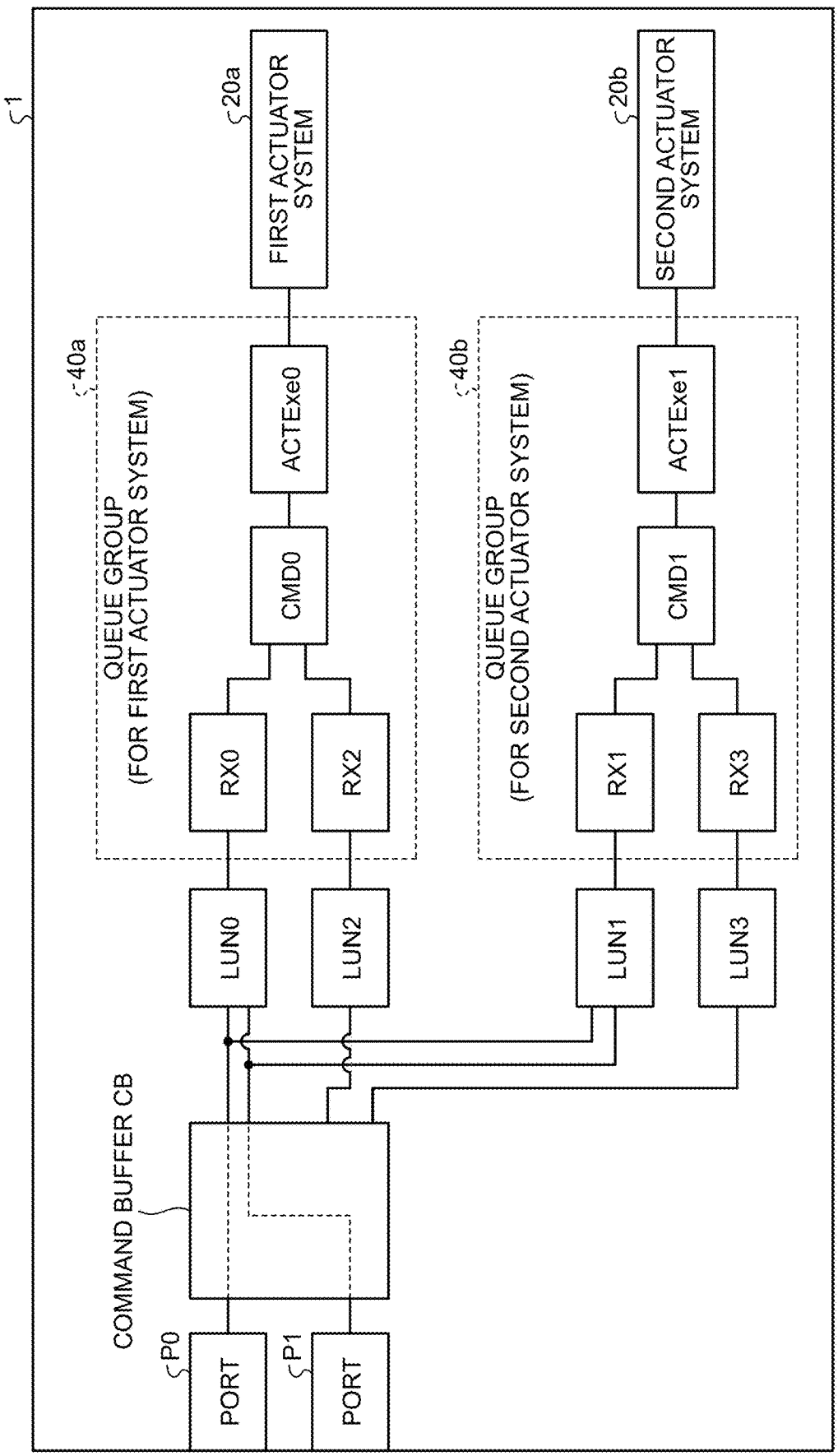
FIG. 2 is a diagram illustrating an example of a configuration for processing a command of the magnetic disk device according to the first embodiment.

FIG. 2 is a diagram illustrating an example of a configuration, for processing a command, of the magnetic disk device 1 according to the first embodiment. In the drawing, it is based on the premise that the magnetic disk device 1 includes two ports P0 and P1; however, the number of ports included in the magnetic disk device 1 is not limited to two.

The controller 30 can set a plurality of logical units in the magnetic disk device 1. The plurality of logical units is regarded as separate devices as viewed from the host 2. With the controller 30 setting a plurality of logical units, the host 2 can handle the magnetic disk device 1 as a plurality of magnetic disk devices.

The controller 30 allocates a LUN as an identification number to each of the plurality of logical units. In this example, the controller 30 sets four logical units and allocates identification numbers of LUN0 to LUN3 to the four logical units. Hereinafter, a logical unit to which LUNx (x is numerical information) is allocated as an identification number is simply referred to as LUNx. Moreover, a logical unit is simply referred to as a LUN.

In a case where a plurality of LUNs is provided to the host 2, the controller 30 distributes and assigns each of the plurality of LUNs to one of the plurality of actuator systems 20. In this example, the controller 30 provides LUN0 and LUN1 to the host 2. Then, the controller 30 assigns LUN0 to the first actuator system 20a and LUN1 to the second actuator system 20b. That is, in a case where an access command targeting LUN0 is received, the controller 30 accesses the recording surfaces of the magnetic disks 10a-1 to 10a-3 using the first actuator system 20a in response to the access command. In a case where an access command targeting LUN1 is received, the controller 30 accesses the recording surfaces of the magnetic disks 10b-1 to 10b-3 using the second actuator system 20b in response to the access command.

The controller 30 further assigns a LUN for the internal processing to each of the plurality of actuator systems 20. In this example, the controller 30 generates LUN2 and LUN3 as LUNs for the internal processing, assigns LUN2 to the first actuator system 20a, and assigns LUN3 to the second actuator system 20b. As a result, the controller 30 can execute the internal processing using either the first actuator system 20a or the second actuator system 20b.

The magnetic disk device 1 includes various memory areas for storing commands. Specifically, the magnetic disk device 1 includes a command buffer CB and two queue groups 40. One of the two queue groups 40 is a queue group 40a for the first actuator system 20a, and the other is a queue group 40b for the second actuator system 20b. Each of the queue groups 40 includes reception queues RX each provided one of the LUNs assigned to the corresponding actuator systems 20, one command control queue CMD, and one execution queue ACTExe. These memory areas are included, for example, in the volatile memory 34. Note that the place where some or all of these memory areas are included is not necessarily in the volatile memory 34.

The controller 30 first stores, in the command buffer CB, a host command input to a port P0 or P1. The controller 30 transfers the host commands stored in the command buffer CB to a reception queue RX corresponding to a target LUN of the LUN0 and LUN1.

In addition, the controller 30 generates an internal processing command when it becomes necessary to execute internal processing. Then, the controller 30 stores the internal processing command in the command buffer CB. The controller 30 sets the target of the internal processing command to either LUN2 or LUN3. More specifically, the controller 30 specifies an actuator system 20 having the smallest number of commands stored in a command control queue CMD, among the first actuator system 20a and the second actuator system 20b. Then, the controller 30 sets a LUN corresponding to the specified actuator system 20 out of LUN2 and LUN3 as the target of the internal processing command.

The controller 30 transfers the internal processing command stored in the command buffer CB to the reception queue RX corresponding to the target LUN out of LUN2 and LUN3.

It is not required for the controller 30 to store the internal processing command in the command buffer CB. The controller 30 may directly store the internal processing command in the reception queue RX corresponding to the target LUN out of LUN2 and LUN3.

In a case where a command (namely, a host command) is stored in the reception queue RX0, the controller 30 transfers the command to the command control queue CMD0. In a case where a command (namely, a host command) is stored in the reception queue RX1, the controller 30 transfers the command to the command control queue CMD1. In a case where a command (namely, an internal processing command) is stored in the reception queue RX2, the controller 30 transfers the command to the command control queue CMD0. In a case where a command (namely, an internal processing command) is stored in the reception queue RX3, the controller 30 transfers the command to the command control queue CMD1.

In a case where one or more commands are stored in the command control queue CMD0, the controller 30 copies the one or more commands to an execution queue ACTExe0. When copying the one or more commands from the command control queue CMD0 to the execution queue ACTExe0, the controller 30 executes command reordering control. The command reordering control is an operation of determining the order of execution of a plurality of commands so that time required for execution the plurality of commands becomes as short as possible. When execution of a command in the execution queue ACTExe0 is completed, the controller 30 deletes the original and the copy of the command from the execution queue ACTExe0 and the command control queue CMD0.

In a case where one or more commands are stored in the command control queue CMD1, the controller 30 copies the one or more commands to an execution queue ACTExe1. When copying the one or more commands from the command control queue CMD1 to the execution queue ACTExe1, the controller 30 executes command reordering control. When execution of a command in the execution queue ACTExe1 is completed, the controller 30 deletes the original and the copy of the command from the execution queue ACTExe1 and the command control queue CMD1.

Note that the command control queues CMD and the execution queues ACTExe are an example of control queues included in each actuator system 20. In a case where the command control queues CMD are included in the volatile memory 34, the volatile memory 34 is an exemplary memory.

Next, the operation of the magnetic disk device 1 according to the first embodiment will be described.

Figure 3:
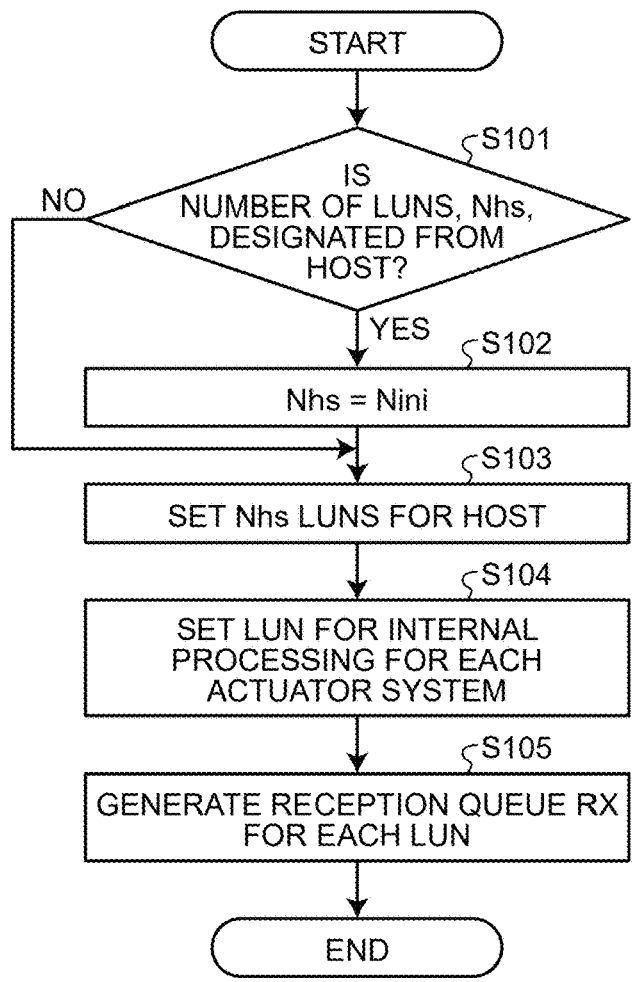
FIG. 3 is a flowchart illustrating an example of an operation of generating LUNs according to the first embodiment.

FIG. 3 is a flowchart illustrating an example of an operation of generating LUNs according to the first embodiment.

The host 2 can designate the number of LUNs (denoted as Nhs) to be provided to the host 2 by using a predetermined command. The controller 30 determines whether or not the number of LUNs, Nhs, is designated from the host 2 by the command (S101).

If the number of LUNs, Nhs, is not designated (S101: No), the controller 30 sets a preset initial value Nini as Nhs (S102).

If the number of LUNs, Nhs, is designated (S101: Yes), or after S102, the controller 30 sets Nhs LUNs for the host 2 (S103). In S103, the controller 30 generates Nhs LUNs for the host 2. Then, the controller 30 associates each of the Nhs LUNs for the host 2 with either actuator system 20 such that the Nhs LUNs for the host 2 are distributed among the plurality of actuator systems 20.

In addition, the controller 30 sets a LUN for internal processing for each of the actuator systems 20 (S104).

The controller 30 generates a reception queue RX for each LUN (S105). Then, the operation of generating LUNs is completed.

For example, in a case where Nhs is "2" and the number of actuator systems 20 is two, the controller 30 generates LUN0 and LUN1 as LUNs of the host 2 in S103. Then, the controller 30 associates LUN0 with the first actuator system 20a and LUN1 with the second actuator system 20b. In S104, the controller 30 generates LUN2 and LUN3 as LUNs for internal processing. Then, the controller 30 associates LUN2 with the first actuator system 20a and LUN3 with the second actuator system 20b. In S105, the controller 30 generates reception queues RX0 to RX3 corresponding to LUN0 to LUN3.

Figure 4:
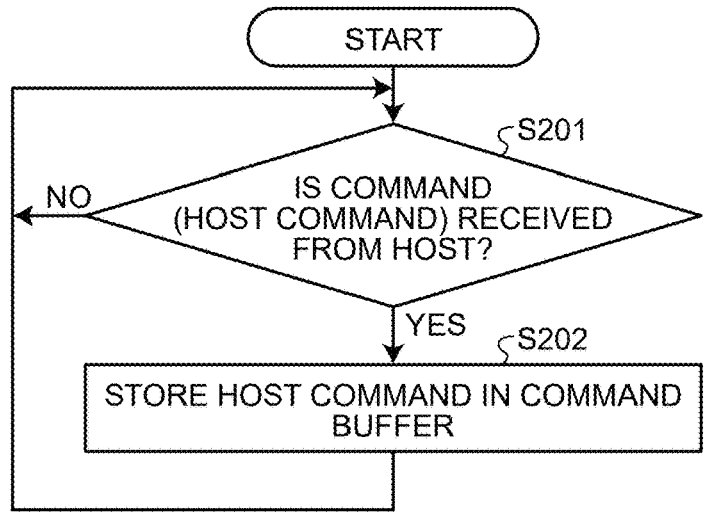
FIG. 4 is a flowchart illustrating an example of an operation at the time of receiving a host command according to the first embodiment.

FIG. 4 is a flowchart illustrating an example of an operation at the time of receiving a host command according to the first embodiment.

The controller 30 determines whether or not a command (namely, a host command) is received from the host 2 (S201). If no host command is received (S201: No), the controller 30 executes the processing of S201 again.

If a host command is received (S201: Yes), the controller 30 stores the received host command in the command buffer CB (S202). Then, the control transitions to S201.

The controller 30 can execute loop processing of S201 to S202 a plurality of times. That is, the controller 30 can receive a plurality of host commands. Note that the host command is an example of the first command.

Figure 5:
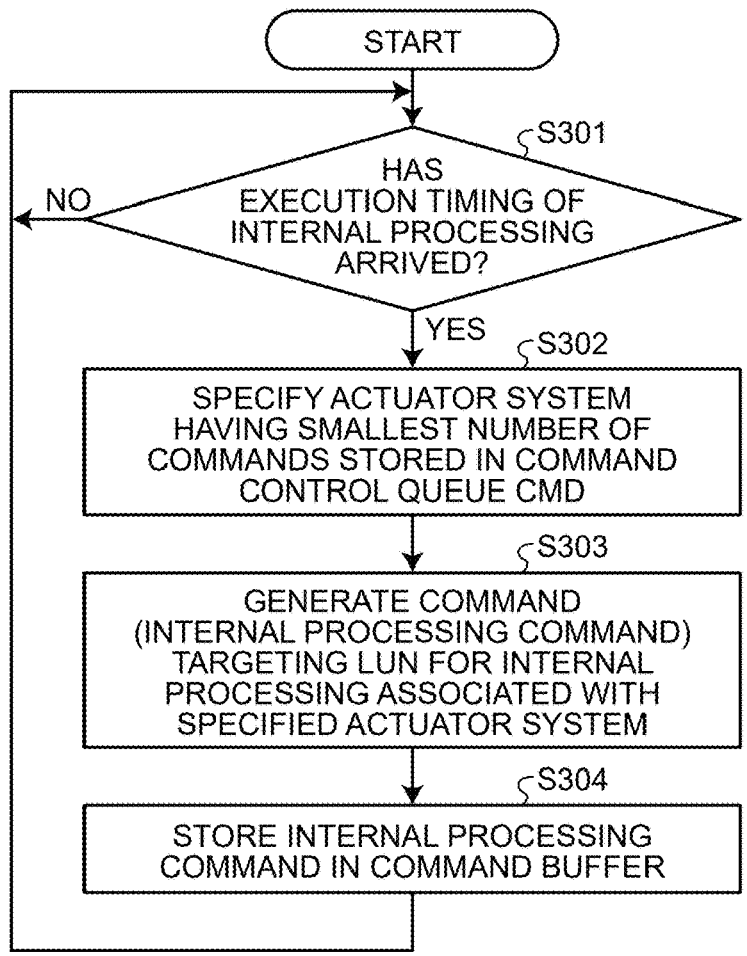
FIG. 5 is a flowchart illustrating an example of an operation at the time of generating an internal processing command according to the first embodiment.

FIG. 5 is a flowchart illustrating an example of an operation at the time of generating an internal processing command according to the first embodiment.

The controller 30 determines whether or not execution timing of internal processing has arrived (S301). As described above, the execution timing of internal processing is not limited to specific timing. If the execution timing of the internal processing has not arrived (S301: No), the controller 30 executes the processing of S301 again.

If the execution timing of the internal processing has arrived (S301: Yes), the controller 30 specifies the actuator system 20 having the smallest number of commands stored in the command control queue CMD (S302). The controller 30 generates an internal processing command targeting the LUN for internal processing associated with the specified actuator system 20 (S303). Subsequently, the controller 30 stores the generated internal processing command in the command buffer CB (S304). Then, the control transitions to S301.

Note that the internal processing command is an example of the second command.

Figure 6:
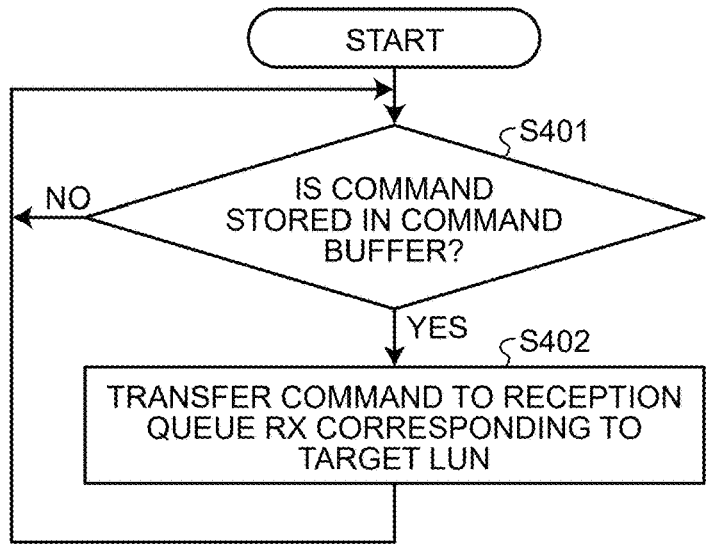
FIG. 6 is a flowchart illustrating an example of an operation of processing a command stored in a command buffer according to the first embodiment.

FIG. 6 is a flowchart illustrating an example of an operation of processing a command stored in the command buffer CB according to the first embodiment.

The controller 30 determines whether or not a command is stored in the command buffer CB (S401). In a case where a command is stored in the command buffer CB, the command is the host command stored in the command buffer CB by the processing of S202 of FIG. 4 or the internal processing command stored in the command buffer CB by the processing of S304 of FIG. 5.

If no command is stored in the command buffer CB (S401: No), the controller 30 executes the processing of S401 again. If a command is stored in the command buffer CB (S401: Yes), the controller 30 transfers the command stored in the command buffer CB to a reception queue RX corresponding to a target LUN (S402). Then, the control transitions to S401.

Figure 7:
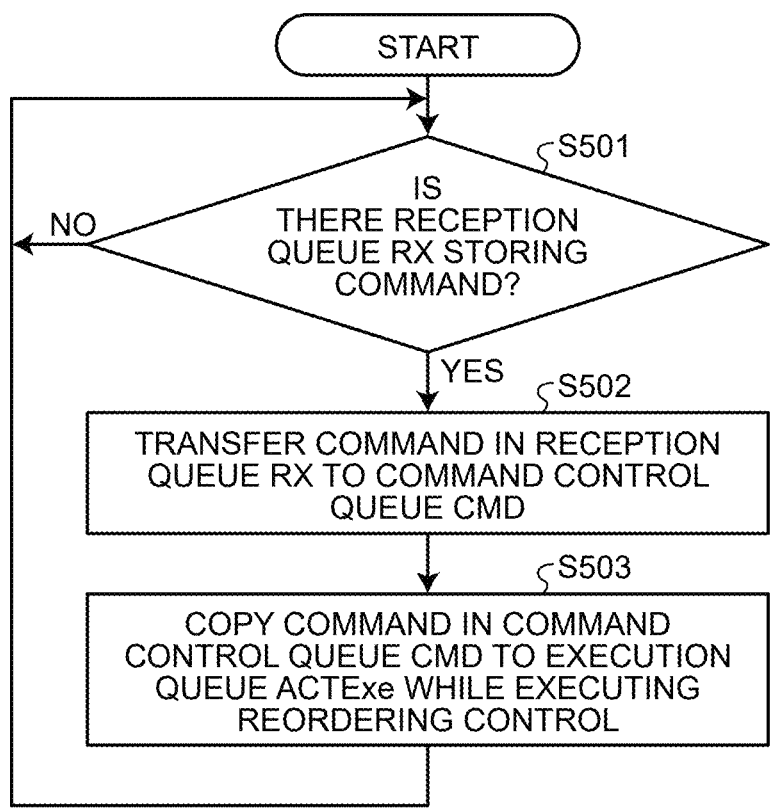
FIG. 7 is a flowchart illustrating an example of an operation of processing a command in each reception queue according to the first embodiment.

FIG. 7 is a flowchart illustrating an example of an operation of processing a command in each reception queue RX according to the first embodiment.

The controller 30 determines whether or not there is a reception queue RX storing a command (S501). If there is no reception queue RX storing a command (S501: No), the controller 30 executes the processing of S501 again.

If there is a reception queue RX storing a command (S501: Yes), the controller 30 transfers the command in the reception queue RX to a command control queue CMD (S502). Then, the controller 30 copies the command in the command control queue CMD to an execution queue ACTExe while executing the reordering control (S503). Then, the control transitions to S501.

The controller 30 sequentially processes one or more commands stored in the execution queue ACTExe by using a corresponding actuator system 20.

In the above description, one LUN for internal processing is set for each actuator system 20. There may be the actuator system 20 in which two or more LUNs for internal processing are set. It suffices that at least one LUN for internal processing be set for each actuator system 20.

Incidentally, in a case where the number of LUNs, Nhs, designated by the host 2 is smaller than the number of actuator systems 20 included in the magnetic disk device 1, one LUN for the host 2 may be assigned to two or more actuator systems 20.

As described above, according to the first embodiment, the controller 30 assigns one or more LUNs for the host 2 to the plurality of actuator systems 20. The controller 30 also assigns a LUN for internal processing to each of the plurality of actuator systems 20. Moreover, the controller 30 generates a reception queue RX in the volatile memory 34 for each LUN. In the case of receiving a host command, the controller 30 transfers the host command to one of the groups of command control queues CMD provided for each of the actuator systems 20 via a reception queue RX corresponding to a target LUN. In the case of generating an internal processing command, the controller 30 specifies the actuator system 20 corresponding to the command control queue CMD that stores the smallest number of commands. Then, the controller 30 sets the LUN for internal processing assigned to the specified actuator system 20 as a target and transfers the internal processing command to one command control queue CMD via the reception queue RX corresponding to the target LUN. The controller 30 processes commands stored in each of the command control queues CMD using a corresponding actuator system 20.

Therefore, when it is necessary to execute the internal processing, it is possible to execute the internal processing using the actuator system 20 having a small number of commands to be executed that are received from the host 2 among the plurality of actuator systems 20. As a result, a decrease in the response speed to a command from the host 2 due to the internal processing is suppressed. That is, it is possible to provide the magnetic disk device 1 having high performance.

In the example described above, each command is transferred to one of the command control queues CMD via the command buffer CB and one of the reception queues RX. The procedure in which the controller 30 stores each command in one of the command control queues CMD is not necessarily limited to the procedure of passing through these memory areas. At least the controller 30 stores each of the plurality of received host commands in one of the command control queues CMD and stores an internal processing command in a command control queue CMD that stores the smallest number of commands. As a result, a decrease in the response speed to a command from the host 2 due to the internal processing can be suppressed.

Note that, in the above-described example, the internal processing includes writing of a log to a magnetic disk 10 or health monitoring. The internal processing may include any processing in addition to or in place of the above.

Second Embodiment

The plurality of actuator systems 20 may include an actuator system 20 that cannot be used for disk access in response to an access command from the host 2. For example, in a case where the performance of one actuator system 20 does not satisfy a predetermined level, this one actuator system 20 and recording surfaces of corresponding magnetic disks 10 are set to be unavailable for a disk access in response to an access command from the host 2. Such an actuator system 20 (hereinafter, an unsuitable actuator system) set to be unavailable for disk access in response to an access command from the host 2 can be used as the actuator system 20 dedicated to internal processing.

Hereinafter, a magnetic disk device according to a second embodiment will be referred to as a magnetic disk device 1a, and description of the magnetic disk device 1a will be given. Note that matters different from those in the first embodiment will be described herein. The same matters as those of the first embodiment will be omitted or briefly described.

Figure 8:
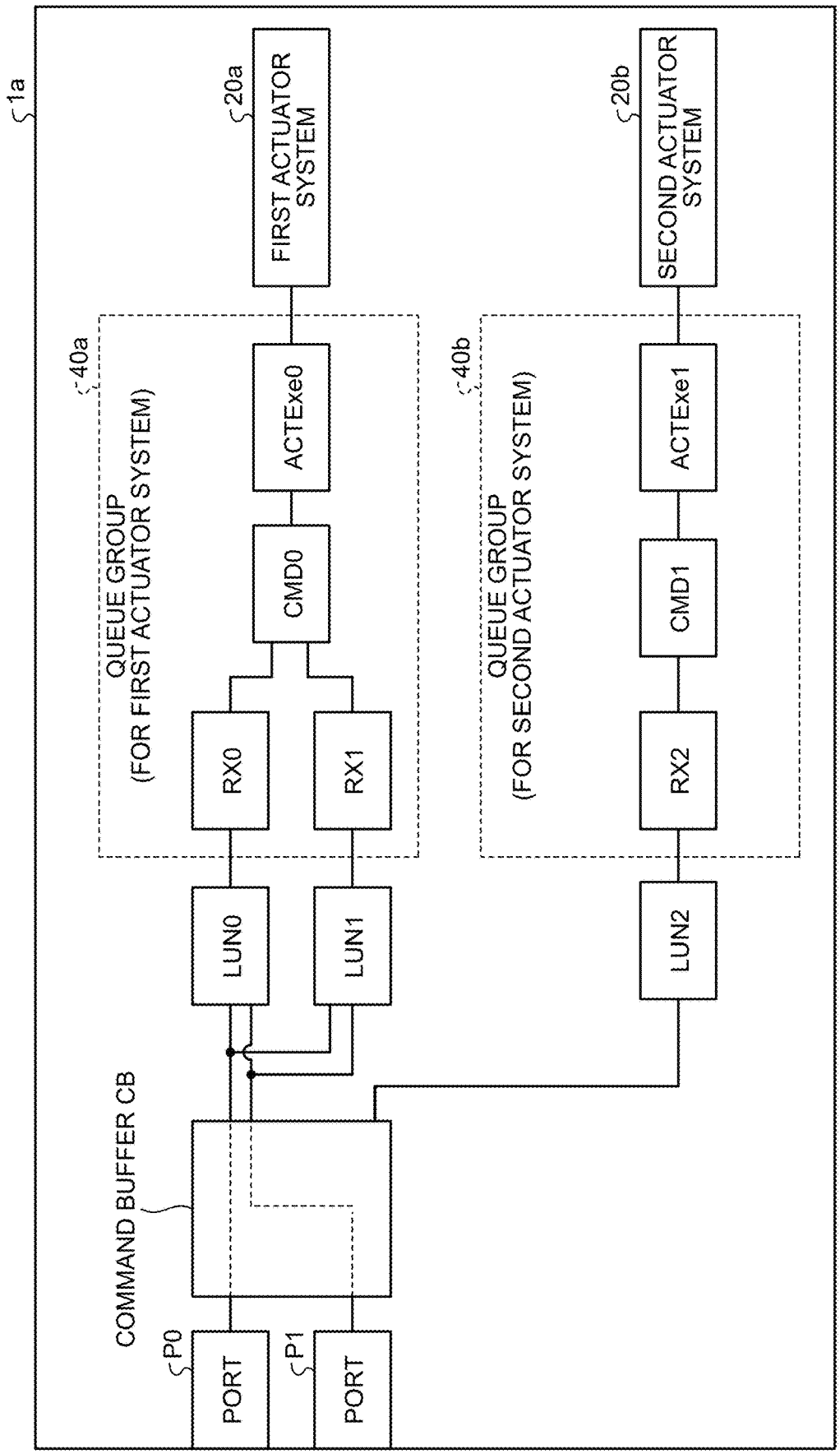
FIG. 8 is a diagram illustrating an example of a configuration, for processing a command, of the magnetic disk device according to a second embodiment.

FIG. 8 is a diagram illustrating an example of a configuration, for processing a command, of the magnetic disk device 1a according to the second embodiment. In this example, it is presumed that a second actuator system 20b out of a first actuator system 20a and the second actuator system 20b is an unsuitable actuator system.

As in the first embodiment, a controller 30 generates a plurality of LUNs in the magnetic disk device 1a. When one or more LUNs are designated from the host 2, the controller 30 generates one or more designated LUNs and assigns the one or more designated LUNs to actuator systems 20 other than the unsuitable actuator system out of the plurality of actuator systems 20. In addition, the controller 30 generates a LUN for internal processing corresponding to the unsuitable actuator system and assigns the LUN for internal processing to the unsuitable actuator system. Then, the controller 30 generates a reception queue RX corresponding to each of the LUNs.

In the example illustrated in FIG. 8, the controller 30 generates LUN0 and LUN1 for the host 2 and assigns LUN0 and LUN1 to the first actuator system 20a. The controller 30 generates LUN2, which is a LUN for internal processing and assigns LUN2 to the second actuator system 20b, which is the unsuitable actuator system. Then, the controller 30 generates a reception queue RX0 corresponding to LUN0, a reception queue RX1 corresponding to LUN1, and a reception queue RX2 corresponding to LUN2.

FIG. 9 is a flowchart illustrating an example of an operation of generating LUNs according to the second embodiment.

Similarly to the first embodiment, the controller 30 executes the processing of S101 to S103. Then, the controller 30 determines whether or not there is an unsuitable actuator system (S601).

For example, before shipment, a test is performed on the plurality of actuator systems 20 included in the magnetic disk device 1a to confirm whether or not the performance of each of the actuator systems 20 satisfies a criterion. The actuator system 20 whose performance does not satisfy the criterion is recorded in the nonvolatile memory 33, for example, as an unsuitable actuator system. The controller 30 determines whether or not there is an unsuitable actuator system by referring to such a record. Note that the method for determining whether or not there is an unsuitable actuator system is not limited to the above.

If there is an unsuitable actuator system (S601: Yes), the controller 30 sets a LUN for internal processing corresponding to the unsuitable actuator system (S602).

If there is no unsuitable actuator system (S601: No), the controller 30 sets a LUN for internal processing for each of the actuator systems 20 (S104).

After S602 or S104, the controller 30 generates a reception queue RX for each of the LUNs (S105). Then, the operation of generating LUNs is completed.

As described above, in a case where there is an unsuitable actuator system, the unsuitable actuator system may be used exclusively for an internal processing command, and the actuator system 20 that is not the unsuitable actuator system may be used for the host 2. A decrease in the response speed to a command from the host 2 due to the internal processing is suppressed since the actuator system 20 exclusive of the actuator systems 20 for the host 2 is used for the internal processing. That is, it is possible to provide the magnetic disk device 1a having high performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a plurality of magnetic heads configured to write and read data to and from the magnetic disk;
   a plurality of actuator systems configured to relatively move some different magnetic heads among the plurality of magnetic heads with respect to the magnetic disk;
   a memory in which a plurality of control queues respectively corresponding to the plurality of actuator systems are provided, each of the plurality of control queues being configured to be capable of storing one or more commands; and
   a controller configured to:
   receive a plurality of first commands from a host;
   store the plurality of first commands in one of the plurality of control queues;
   generate a second command for internal processing;
   store the second command in a first control queue, the first control queue being a control queue, which stores a smallest number of commands, among the plurality of control queues;
   execute, for each of the plurality of control queues, processing one or more commands stored in one control queue of the plurality of control queues by using an actuator system corresponding to the one control queue among the plurality of actuator systems
   assign one or more first logical unit numbers (LUNs), which are one or more LUNs for the host, to the plurality of actuator systems;
   respectively assign a plurality of second LUNs to the plurality of actuator systems;
   generate reception queues for a plurality of third LUNs including the one or more first LUNs and the plurality of second LUNs;
   store the plurality of first commands in the one of the plurality of control queues via a reception queue of the reception queues corresponding to a target first LUN among the one or more first LUNs;
   generate the second command targeting a fourth LUN that is a second LUN assigned to the actuator system corresponding to the first control queue among the plurality of second LUNs; and
   transfer the second command to the first control queue via a reception queue of the reception queues corresponding to the fourth LUN.

2. The magnetic disk device according to claim 1, wherein the internal processing includes writing of a log to the magnetic disk or health monitoring.

3. The magnetic disk device according to claim 1, wherein the internal processing includes writing of a log to the magnetic disk or health monitoring.

4. A method of controlling a magnetic disk device, the magnetic disk device comprising a magnetic disk, a plurality of magnetic heads configured to write and read data to and from the magnetic disk, a plurality of actuator systems configured to relatively move some different magnetic heads among the plurality of magnetic heads with respect to the magnetic disk, and a memory, the method comprising:
   receiving a plurality of first commands from a host;
   storing the plurality of first commands in one of a plurality of control queues, the plurality of control queues respectively corresponding to the plurality of actuator systems;
   generating a second command for internal processing;
   storing the second command in a first control queue, the first control queue being a control queue, which stores a smallest number of commands, among the plurality of control queues;
   executing, for each of the plurality of control queues, processing one or more commands stored in one control queue of the plurality of control queues by using an actuator system corresponding to the one control queue among the plurality of actuator systems;
   assigning one or more first LUNs, which are one or more LUNs for the host, to the plurality of actuator systems;
   respectively assigning a plurality of second LUNs to the plurality of actuator systems;
   generating reception queues for a plurality of third LUNs including the one or more first LUNs and the plurality of second LUNs;
   storing the plurality of first commands in the one of the plurality of control queues via a reception queue of the reception queues corresponding to a target first LUN among the one or more first LUNs;
   generating the second command targeting a fourth LUN that is a second LUN assigned to the actuator system corresponding to the first control queue among the plurality of second LUNs; and
   transferring the second command to the first control queue via a reception queue of the reception queues corresponding to the fourth LUN.

5. The method according to claim 4, wherein the internal processing includes writing of a log to the magnetic disk or health monitoring.

6. The method according to claim 4, wherein the internal processing includes writing of a log to the magnetic disk or health monitoring.

* * * * *